(12) United States Patent
Hayami

(10) Patent No.: US 8,321,951 B2
(45) Date of Patent: Nov. 27, 2012

(54) LICENSE INFORMATION MANAGEMENT APPARATUS, METHOD, AND PROGRAM

(75) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 12/960,329

(22) Filed: Dec. 3, 2010

(65) Prior Publication Data

US 2011/0162080 A1 Jun. 30, 2011

(30) Foreign Application Priority Data

Dec. 28, 2009 (JP) ................................. 2009-298193

(51) Int. Cl.
*G06F 21/00* (2006.01)
(52) U.S. Cl. ................. 726/26; 721/31; 705/50; 705/59
(58) Field of Classification Search .................... 726/26, 726/31; 705/59
See application file for complete search history.

(56) References Cited

U.S. PATENT DOCUMENTS

| 5,390,297 | A | * | 2/1995 | Barber et al. | 726/29 |
| 6,226,747 | B1 | * | 5/2001 | Larsson et al. | 726/31 |
| 6,460,142 | B1 | * | 10/2002 | Colvin | 726/27 |
| 6,959,291 | B1 | * | 10/2005 | Armstrong et al. | 705/59 |
| 2005/0251490 | A1 | * | 11/2005 | Coley et al. | 705/59 |
| 2006/0294019 | A1 | * | 12/2006 | Dayan et al. | 705/59 |

FOREIGN PATENT DOCUMENTS

JP 11-219282 8/1999

* cited by examiner

*Primary Examiner* — Ponnoreay Pich
(74) *Attorney, Agent, or Firm* — Fitzpatrick, Cella, Harper & Scinto

(57) ABSTRACT

A license management shared module, which is shared by a plurality of software, carries out use management of software by obtaining licenses from a license server. A deletion module determines whether or not this software is using licenses when the software is to be deleted, and returns the license to the license server based on the result of the determination. In addition, a deletion module determines whether or not software other than the software to be deleted is subject to use management, and in the case in which it has been determined that software other than the software to be deleted is not subject to use management, deletes the license management shared module.

6 Claims, 5 Drawing Sheets

LICENSE INFORMATION MANAGEMENT APPARATUS, METHOD, AND PROGRAM

BACKGROUND OF THE INVENTION

1. Field of the Invention

The present invention relates to an information processing apparatus and a control method for an information processing apparatus.

2. Description of the Related Art

A computer accessing a distributed resource via a network has been proposed. Frequently, software executed by a computer is also used in a network environment, and now computers can execute the software anywhere via a network. Software that is used in such a network environment can be accessed by any number of people, and thus, frequently the computers that can use the software and the number of copies of the software are restricted by a license. Generally, two types of format are used for software licenses: anode lock license format and a floating license format. A node lock license format is a license format in which a license is registered on a particular computer to enable the use of the software. The floating license format is a license format in which the licenses are managed by license servers, and software is used after obtaining a license from a plurality of computers on a network. Specifically, a floating license is a license method that is adapted to a system in which a plurality of computers is connected so as to be able to communicate with each other by using a network.

In the floating license format, a license confirmation program is, for example, permanently resident on a license server that is connected to a plurality of client apparatuses via a network. When the client apparatuses activate an application, this application calls a license confirmation program on the license sever. The license confirmation program that has been called checks the operating environment based on information that is transmitted from the application of the client apparatus, and when the operating environment is appropriate, operation permission is provided to the application.

Japanese Patent Laid-Open No. H11-219282 discloses a program management method for a computer in which, when a shared program that is shared by a plurality of shared objects is uninstalled, in the case in which a shared object does no longer exists, this shared program is uninstalled.

However, the technology that uninstalls a program, which is disclosed in Japanese Patent Laid-Open No. H11-219282, does not take into consideration license information that is managed on license servers, and thus, has the following problem. Specifically, license information corresponding to the uninstalled software remains on the license servers. The license information shows that the software has been used on a client apparatus, and thus, even though the software has been deleted, the software license information remains on the license servers. When this occurs, appropriate license management cannot be carried out.

SUMMARY OF THE INVENTION

The information processing apparatus of the present invention is the information processing apparatus that communicates via a network with a management apparatus that manages license information for the use of software. The information processing apparatus includes a use management unit configured to be shared by a plurality of software and carries out use management of the software by obtaining license information for software from the management apparatus, a first determining unit configured to determine whether or not license information for a plurality of software is being managed by the use management unit when a software among a plurality of software is to be deleted, a return unit configured to return the license information to the management apparatus in the case in which the first determination unit has determined that license information for software to be deleted is managed by the use management unit, a deleting unit configured to delete software for which the license information has been returned by the return unit, and a second determination unit configured to determines whether or not software other than the software to be deleted among the plurality of software is subject to use management by the use management unit. The deleting unit deletes the use management unit in the case in which the second determining unit has determined that software other than the software to be deleted is not subject to use management by the use management unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 6:
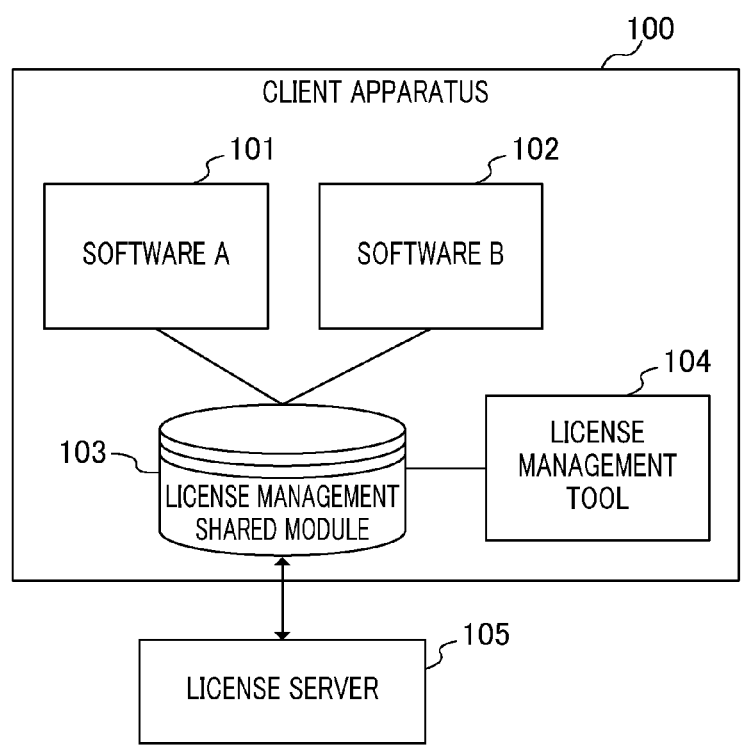
FIG. 6 is a drawing that shows an example of a system having the same floating license format system for a plurality of different software.

FIG. 6 is a drawing that shows an example of a system having the same floating license system for a variety of different software. As shown in FIG. 6, software A (software 101) and software B (software 102), which differ from each other, are installed on a client apparatus 100. The license management shared module 103, which is provided on the client apparatus 100, obtains a license from the license server 105 to enable the use of the software. The license includes a standard license ("standard license") and a trial license ("trial license"). The license management shared module 103 is a shared program that includes a license confirmation program and is shared by software A and B. Specifically, the license management shared module 103 is a unit that carries out software use management (for example, license management), and provides the licensing function to software A and B. The license management shared module 103 ascertains the license status of all software on the client apparatus 100, and information representing this license status is passed to the license management tool 104. The license management tool 104 displays information that indicates the license status that has been passed from the license management shared module 103.

The license server 105 is connected to the client apparatuses 100 via a network. The license server 105 manages the license information. The license information is information for a license that is issued to software when software that is installed on a client apparatus 100 is used. In addition, the license server 105 manages information about which client apparatus 100 is currently using the license and information about the total number of licenses being used. When software A and B, which are installed on client apparatus 100, are started up, a license is obtained from the license server 105 via the license management shared module 103 and then used. The license that the software has obtained is automatically returned to the license server 105 when the use of the license is stopped. The client apparatus 100 may return the license to the license server 105 by the user of the client server 100 carrying out an operation input by using the license management tool 104.

Suppose the case in which software A is deleted on the client apparatus 100. When the license management shared module 103 for software A is deleted along with the software, in the client apparatus 100, the license management of software B, which uses the license management shared module 103, can no longer be carried out. Therefore, it is contemplated that processing is carried out such that when the client apparatus 100 deletes installed software, the license management shared module 103 is not deleted. However, once the license management shared module 103 has been installed on the client apparatus 100, it is undesirable that the license management shared module 103 is not deleted even though all of the software that is subject to license management has been deleted. In addition, it is undesirable that the entity of the license management tool 104 for the license management shared module 103 and that information such as shortcuts appended thereto remain on the client apparatus 100.

Here, consider deleting the license management shared module 103 when software is deleted from a client apparatus 100 by using conventional technology. If the license management shared module 103 is deleted when software is deleted from the client apparatus 100, the following new problems occur because the license information that is managed on the license server 105 is not taken into consideration. Assume, for example, that only software A is installed on the client apparatus 100 that is shown in FIG. 6. Here, suppose the case in which the client apparatus 100 deletes the software A and that the client apparatus 100 deletes the license management shared module 103 and the license management tool 104 by using the method disclosed in Japanese Patent Laid-Open No. H11-219282. However, in this case as well, license information corresponding to deleted software that is managed by the license server 105 remains on the license server 105. The license information shows that the software is being used in the client 100, and thus, if license information for software A remains on the license server 105 even though software A has been deleted, appropriate license management cannot be carried out.

In addition, the following problem occurs with respect to returning the license that accompanies the deletion of the software. Even if the client apparatus 100 returns the license by using the license management tool 104, the license cannot be returned if the license management shared module 103 and the license management tool 104 are deleted at the same time that the software is deleted. There is the problem that even if the client apparatus 100 returns the license before deleting the software, the client apparatus 100 may mishandle the return procedure for the license. In addition, after the user of the client apparatus 100 has noticed that the return procedure for the license is in error, in the case in which the user wishes to return the license, the software must be reinstalled in the client apparatus 100. Problems such as those described above may cause problems not only related to licenses, but, for example, related to arbitrary special information about the use of software, such as the personal information of the user that is using the software.

Next, an embodiment will be explained that solves the problems that occur when executing a software uninstall and deleting a license management module in the case in which a plurality of types of software that require a license and a license management module are present on the client apparatus.

Figure 1:
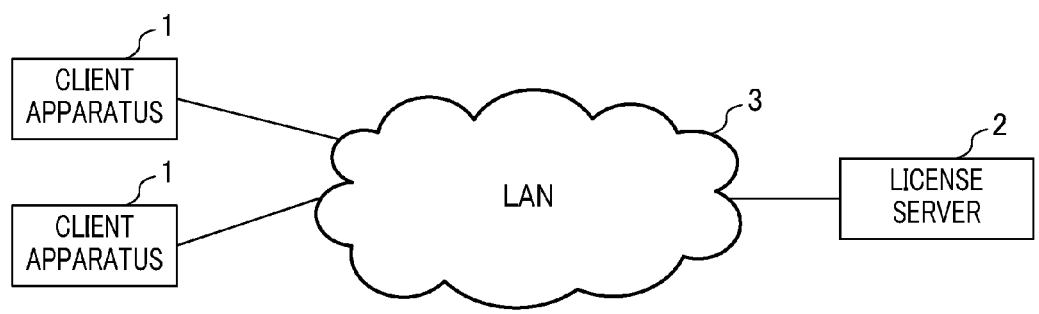
FIG. 1 is a drawing that shows an example of the system configuration of the present embodiment.

FIG. 1 is a drawing that shows an example of a system configuration for the present embodiment. The system shown in FIG. 1 includes a license server 2, and plural client apparatuses 1 that are connected to the license server 2 via a LAN (Local Area Network) 3. The license server 2 and the client apparatuses 1, for example, can carry out communication such as transmitting and receiving files via a LAN 3 by using a prescribed protocol such as TCP/IP and the like. Note that TCP/IP is the abbreviation of "Transmission Control Protocol/Internet Protocol". Also note that besides a LAN, the client apparatuses 1 and the license server 2 that are provided in the system of the present embodiment may be connected by any freely chosen network.

The client apparatuses 1 are the information processing apparatuses of the present embodiment. The client apparatuses 1 are computers such as, for example, a desktop PC (Personal Computer) or a mobile PC or the like. In the present embodiment, the client apparatuses 1 are assumed to be ones that are managed by the license server 2 using a floating license format. After the client apparatuses 1 have obtained a license for using the software that has been installed on the client apparatuses 1 from the license server 2, the client apparatuses 1 execute this software. The license server 2 is a management apparatus that manages the license information (below, simply referred to as a "license") that is used by the software that has been installed on the client apparatuses 1. License information is one type of special information related to software use, and the client apparatus 1 can use software by obtaining a license from the license server 2.

Figure 2A:
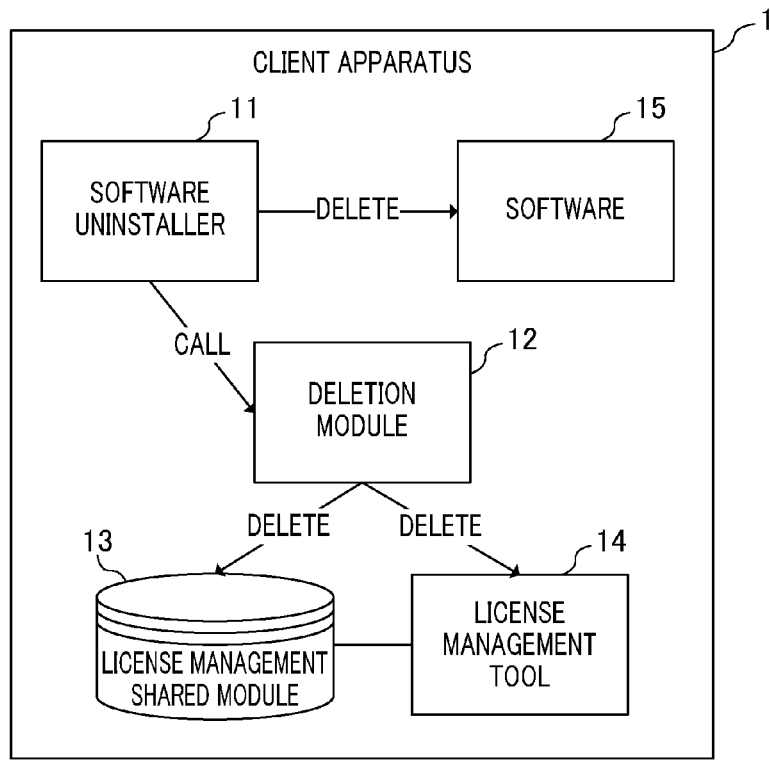
FIG. 2A is a drawing that shows an example of the functional configuration of a client apparatus.

FIG. 2A shows an example of the functional configuration of a client apparatus. FIG. 2A shows, among the processing units provided in the client apparatus 1, the processing unit for the deletion processing of software. The client apparatus 1 includes a software uninstaller 11, a deletion module 12, a license management shared module 13, and a license management tool 14. In addition, in the example shown in FIG. 2A, it is assumed that software 15 is installed in the client apparatus 1 by a software installer (not illustrated in the figures). The software 15 is any arbitrary software such as word processing software, spread sheet software, database software, image editing software, game software, editing software or the like. The license management shared module 13 has a function similar to that of the license management shared module 103 described above with reference to FIG. 6. That is, the license management shared module 13 is shared by a plurality of software. In addition, the license management shared module 13 functions as a use management unit that carries out use management of the software by obtaining licenses for the use of software from the license server 2 shown in FIG. 1. Specifically, the license management shared module 13 receives requests from the software of the object to be executed, and transmits identification information of the client apparatus 1, the unit information of the client apparatus 1, and the license access number to the license server 2. The license access number is a number that is affixed as a unique identifier to the package of the software, and is a number that is necessary when requesting the license server 2 to issue a license.

The license server 2 determines whether or not license certification is possible by referring to a database, which is stored in advance on a license server 2, containing the identification numbers, unit information, and license access numbers. When license certification has been carried out by the license server 2, the license management shared module 13 obtains the license from the license server 2, and the software can be used. The license management tool 14 includes a function similar to that of the license management tool 104 that has been described above with reference to FIG. 6. Specifically, the license management tool 14 displays information that shows the license status of the software that is installed on the client apparatus 1.

The software uninstaller 11 deletes the software 15. The software uninstaller 11 calls the deletion module 12 when executing the deletion of any of the software (software 15) among a plurality of software. The software uninstaller 11 is stored in a predetermined memory unit of the client apparatus 1 when the client apparatus 1 installs the software 15. The deletion module 12 carries out the following processing when called by the software uninstaller 11, that is, when the software 15 is deleted. The deletion module 12 functions as a first determining unit that determines whether or not licenses for a plurality of software are being managed by the license management shared module 13. In addition, the deletion module 12 functions as a return unit that returns the license to the license server 2 in the case in which the deletion module 12 has determined that the license for the software to be deleted is being managed by the license management shared module 13. In addition, the deletion module 12 functions as a deletion unit that deletes the software for which the license has been returned. The return of the license deletes the software license that is the object of deletion, which is subject to use management by the license management shared module 13, and updates, in the license server 2, the license information that is managed by the license server 2. The updating of this license information sets the status of the license for the software that is the object of deletion on the client apparatus 1 to unused.

In addition, the deletion module 12 functions as a second determining unit that determines whether software besides the software to be deleted is subject to use management by the license management shared module 13. In addition, the deletion module 12 deletes the shared license management module 13 and the license management tool 14 in the case in which it has determined that no software other than the software to be deleted is subject to use management by the license management shared module 13. Furthermore, the deletion module 12 may determine whether to return a license to a license server 2 according to the type of license that is used by the software to be deleted. In the case in which software other than the software to be deleted is subject to use management by the license management shared module 13, the deletion module 12 may determine whether or not to delete the license management shared module 13 and the license management tool 14 in the following manner. The deletion module 12 determines whether to delete the license management shared module 13 and the license management tool 14 according to the type of the license used by software (software other than the software to be deleted) that has been determined to be subject to use management. The control method and for the information processing apparatus of the present embodiment and a computer program therefore are realized by each of the structural elements provided in the client apparatus 1 shown in FIG. 2A.

In the example shown in FIG. 2A, the deletion module 12 receives a call from the software uninstaller 11 and executes deletion processing on the license management shared module 13 and the license management tool 14, but examples of the application of the present invention are not limited by the example that is shown in FIG. 2A. That is, the user of the client application 1 may direct which software to delete, and according to this direction, the deletion module 12 may execute deletion processing of the license management shared module 13 and the license management tool 14.

Figure 2B:
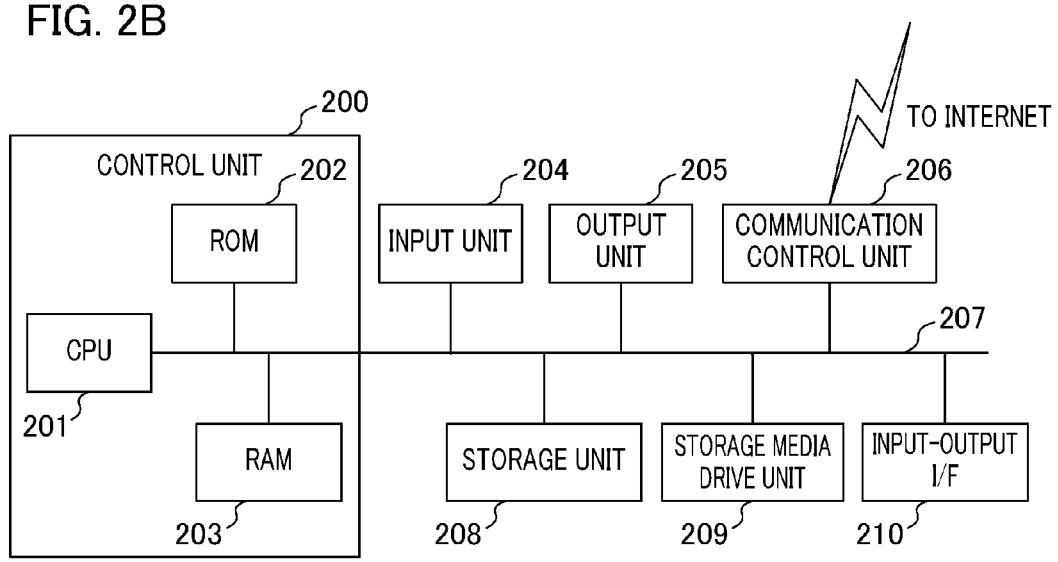
FIG. 2B is a drawing that shows an example of the hardware configuration of a client apparatus.

FIG. 2B shows an example of the hardware configuration of a client apparatus. The client apparatus 1 includes a control unit 200, an input unit 204, an output unit 205, a communication control unit 206, a memory unit 208, a storage media driving unit 209, and an input/output IF (interface) 210. Each element from the control unit 200 to the input/output interface 210 is connected via a bus line 207. The bus line 207 mediates the transmission and reception of data signals and control signals and the like between the control unit 200 and the other structural elements.

The control unit 200 controls the operation of the client apparatus 1. The control unit 200 includes a CPU 201, ROM (Read Only Memory) 202, and RAM (Random Access Memory) 203. The CPU 201 carries out various types of calculation, information processing, and the control processing of the client apparatus overall according to a predetermined program. As an operation that is unique to the present embodiment, the CPU 201 controls the operation of the software uninstaller 11, the deletion module 12, the license management unit 13, and the license management tool 14, which are shown in FIG. 2A. In addition, the CPU 201 executes the software that has been installed on the client apparatus 1.

The ROM 202 is a storage apparatus that stores various types of programs, data, and parameters and the like that are used in order for the CPU 201 to carry out various types of calculation and control. The RAM 203 is a randomly accessible storage apparatus that is used by the CPU 201 as working memory. In the present embodiment, areas for the CPU 201 to carry out the obtaining of licenses and the activation of software and the like are secured in the RAM 203.

The input unit 204 includes an input apparatus such as, for example, a keyboard and a mouse. The keyboard is an apparatus that inputs information such as characters and numbers to the client apparatus 1. The keyboard includes keys for inputting, for example, Japanese alphabet characters and English alphabet characters, a ten key pad for inputting numbers, various function keys, a cursor key, and other keys. The keyboard inputs, for example, license access numbers that are transmitted to the license server 2 according to user operations. The mouse is a pointing device. When the user operates the client apparatus 1 by using a GUI (Graphical User Interface) or the like, the predetermined information can input by clicking with the mouse the buttons and icons and the like that are displayed on the display apparatus. For example, the client apparatus 1 displays icons that represent the installed software on a display apparatus, and the CPU 201 activates the software depending icons that are clicked by the user with the mouse.

The output unit 205 is provided, for example, with a display apparatus and a printing apparatus and the like. The display apparatus displays various types of information on a screen providing, for example, a CRT (Cathode Ray Tube) display, a liquid crystal display, or a plasma display. The display apparatus displays the input result of the keyboard and mouse, and screens provided by software (for example, a user interface). The printing apparatus includes various printer apparatuses such as, for example, an ink injection printer, a laser printer, a heat transfer printer, or a dot printer. The printing apparatus prints the output results (text, images, or the like) on a printing medium such as paper.

The communication control unit 206 connects the client apparatus 1 to the various server apparatuses (license server 2, Web server, mail server and the like) via a network (for example, LAN 3 or the internet). The communication control unit 206 includes an apparatus such as, for example, a modem or a terminal adaptor and the like. When the communication control unit 206 carries out communication via the internet, a protocol such as TCP/IP, for example, is used. The communication control unit 206 establishes and maintains communication between the client apparatus 1 and the license server 2, and receives the license used by the software from the license server 2. The storage unit 208 includes a writable storage medium and a drive apparatus for writing a program or data on the storage medium. In the present embodiment, the storage unit 208 is a local disk that includes a hard disk. Note that the storage medium that is provided by the storage unit 208 may be a magneto-optical disk, a magnetic disk, semiconductor memory, and the like.

The storage unit 208 stores information about licenses obtained from the license server, software, and the license managing module 13 and the license management tool 14 shown in FIG. 2A. In addition, the storage unit 208 stores, for example, character conversion software for converting Japanese alphabet characters to ideographs, and browser software for displaying Web pages received from the various server apparatuses on a display apparatus. In addition, the storage unit 208 stores communication programs that control the communication control unit 206 and communication programs that support communication via a network. In addition, the storage unit 208 stores an OS (Operating System), which is basic software such as memory management and input/output management and the like, for operating the client apparatus 1. The storage media drive unit 209 is a drive unit that writes data by driving a detachable storage medium. The detachable storage medium is, for example, a magneto-optic disk, a magnetic disk, a magnetic tape, semiconductor memory, a paper tape into which data is punched, or a CD-ROM or the like. The input/output IF 210 is, for example, a standard interface such as a serial interface or the like. The functions of the client apparatus 1 can be expanded by connecting external units that are compatible with the standards of the input/output IF 210 to the input/output IF 210. These external units are, for example, storage apparatuses such as a hard disk, a speaker, and a microphone and the like.

Figure 3:
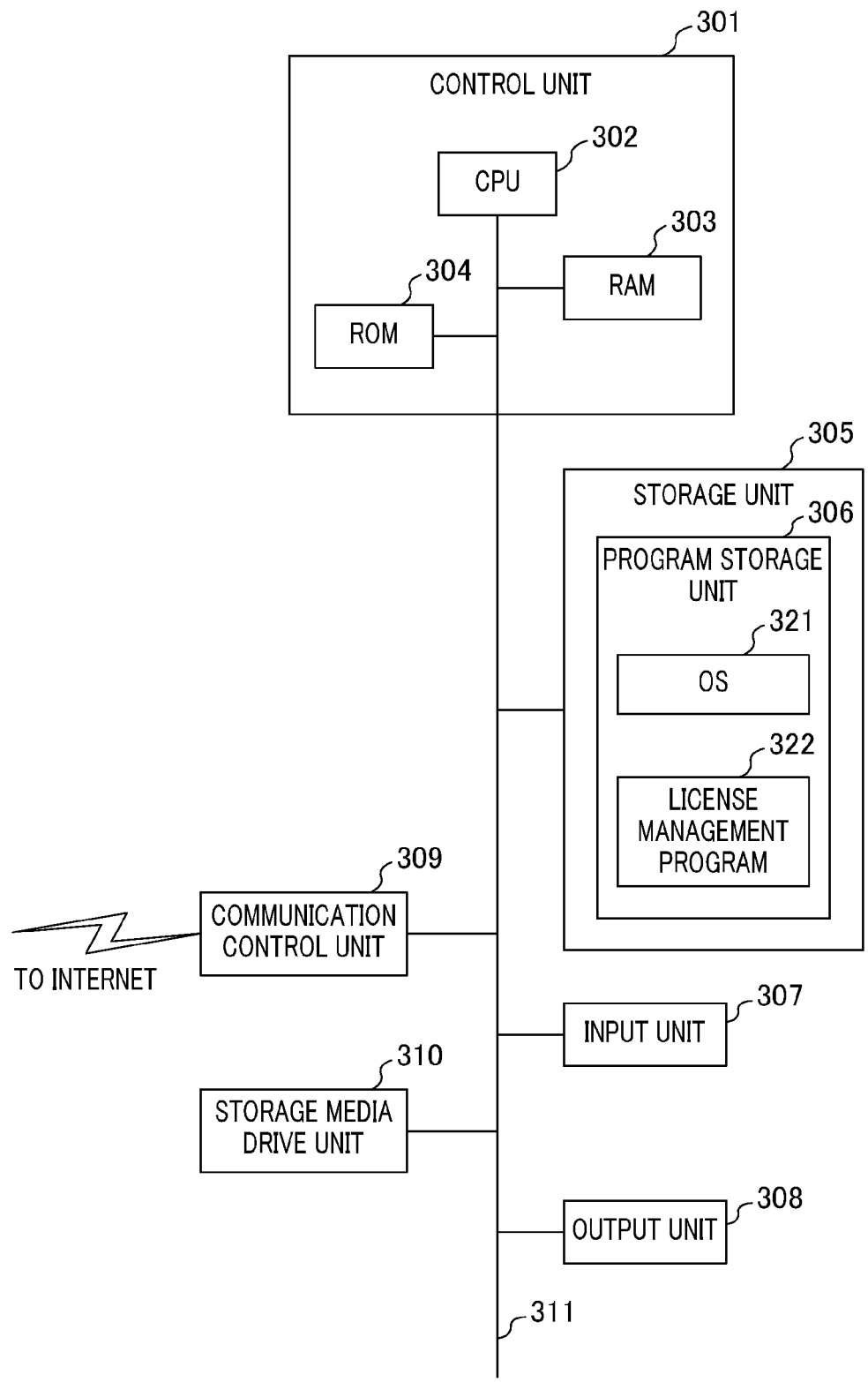
FIG. 3 is a drawing that shows an example of the hardware configuration of a license server.

FIG. 3 is a drawing that shows an example of a hardware configuration for a license server. The license server 2 includes a control unit 301, storage unit 305, an input unit 307, an output unit 308, a communication control unit 309, and a storage media drive unit 310. The units from control unit 301 to the storage media drive unit 310 are connected via a bus line 311. The control unit 301 controls the operation of the license server 2. The control unit 301 includes a CPU 302, ROM 304, and RAM 303. The CPU 302 carries out various types of calculation, information processing, and control processing of the license server overall according to a predetermined program. Specifically, the CPU 201 carries out license certification processing related to the use of software by a client apparatus 1. In addition, the CPU 201 updates the license information corresponding to the client apparatus 1 that is controlled by the license server 2 depending on the return of the license from the client apparatus 1. The RAM 303 is a randomly accessible storage apparatus that is used as working memory by the CPU 302. ROM 304 is a storage apparatus that stores various programs, data, and parameters and the like that are used in order for the CPU 302 to carry out various calculations and control.

The storage unit 305 is a readable-writable storage medium that is formed, for example, by a large capacity hard disk and the like. The storage unit 305 includes a program storage unit 306. The program storage unit 306 stores the OS 321 and the license management program 322. The license management program 322 is a program causing the CPU 302 to perform a function for executing license certification processing for the client apparatus 1. The license certification processing is processing that determines whether or not the issuing of a license is permitted. The CPU 302 operates according to the license management program, and refers to a database that stores in advance, on the ROM 304, the identification information, unit information, and license access number of the client apparatus 1 that has been transmitted from the client apparatus 1. This database includes information, determined in advance, that associates a client apparatus and the identification information and unit information thereof. In addition, this database includes information, determined in advance, that associates a client unit 1, whose license certification is permitted, and a license access number. Based on the reference result, the CPU 302 executes an identification determination processing for the client apparatus 1 and determines whether to permit the issuing of a license. In addition, the CPU 302 transmits the identification determination processing result for the client apparatus 1 and the determination result about whether to permit the issuance of a license to the client apparatus 1 via the communication control unit 309 and the network. In the case in which the CPU 302 permits the issuance of a license, the determination result for whether to permit the issuance of a license includes a license by which the software that is executed by the client apparatus 1 is used.

The input unit 307, the output unit 308, and the storage media drive unit 310 are similar to the input unit 204, the output unit 205, and the storage media drive unit 209, which are each provided in the client unit 1 that was explained with reference to FIG. 2B, and thus, the explanation thereof is omitted. The communication control unit 309 communicates with the client apparatus 1 and the like via the network. Specifically, the communication control unit 309 receives the identification information, unit information, and a license access number for the client apparatus 1 from the client apparatus 1. In addition, the communication control unit 309 transmits the identification determination processing results and the determination result about whether or not to permit license confirmation for the client apparatus 1 to the client apparatus 1.

Figure 4:
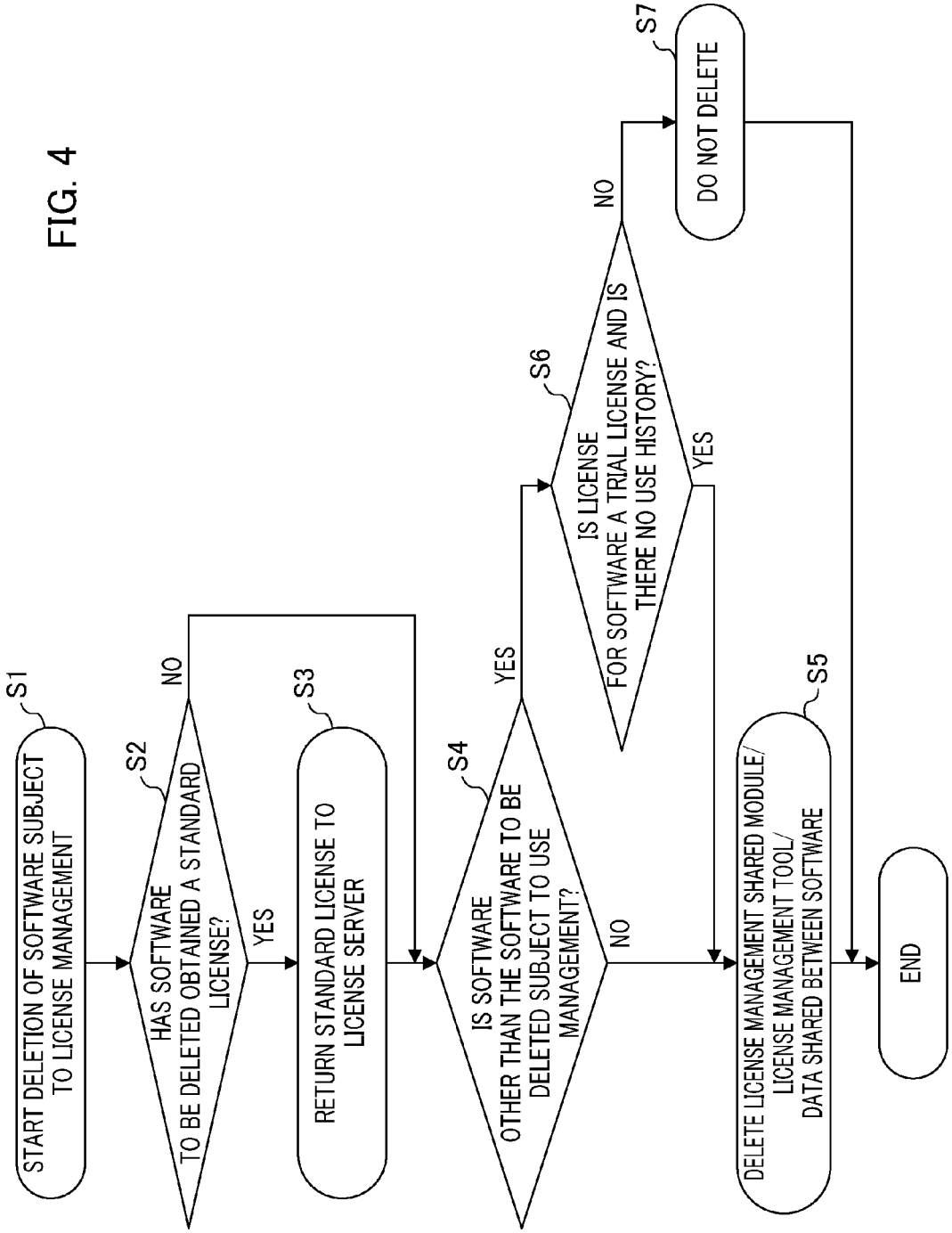
FIG. 4 is an example of the operation processing flow of a client apparatus during software deletion.

FIG. 4 is a drawing that shows an example of the operation processing flow for the client apparatus during software deletion. First, the software uninstaller 11 provided in the client apparatus 1 starts the deletion of the software that is subject to use management, that is, license management (step S1), and calls the deletion module 12. Next, the deletion module 12 determines whether the software that is the object of deletion has obtained a standard license from the license server 2 (step S2). In the case in which the deletion module 12 has determined that the software that is the object of deletion has not obtained a standard license from the license server 2, the processing proceeds to step S4. For example, in the case in which the type of the license obtained by the software that is the object of deletion is a trial license that can be used for a limited period of time, the deletion module 12 determines that the software that is the object of deletion has not obtained a standard license. In the case in which the deletion module 12 has determined that the software that is the object of deletion has obtained a standard license, the processing moves to step S3.

In step S3, the deletion module 12 returns a standard license for the software that is the object of deletion to the license server 2 (step S3). Thereby, the license information at the license server 2 is updated. Subsequently, the deletion module 12 carries out the deletion (uninstalling and the like) of the software that is the object of deletion. Next, the deletion module 12 determines whether software other than the software that is the object of deletion is subject to use management by the license management shared module 13 (step S4). In the case in which the deletion module 12 has determined that software other than the software that is the object of deletion is not subject to use management by the license management and sharing module 13, the license management shared module 13 and the license management tool 14 are deleted (step S5). Thereby, because it has been confirmed that software other than the software to be deleted is not subject to use management, the shafted license managing module 13 and the license management tool 14 are deleted. Therefore, the license management shared module 13 and the license management tool 14 can be deleted while maintaining security.

In the case in which the deletion module 12 has determined that software other than the software that is the object of deletion is subject to use management by the license management shared module 13, the deletion module 12 carries out the following processing. The deletion module 12 inquires the license management shared module 13 to obtain the type of the license that the software subject to use management (the software other than the software that is the object of deletion) has obtained. Then, based on the type of the obtained license, the deletion module 12 determines whether all of the licenses of the software subject to use management are trial licenses, and whether there is a use history of the trial license for the other software (step S6). That is, the deletion module 12 determines whether unused trial licenses for software other than the software that is the object of deletion are managed by the license management shared module 13. In the case in which the licenses of the software subject to use management are all trial licenses and there is no use history for the trial licenses, the processing proceeds to step S5. In the case in which the license of software subject to use management is a standard license or one or more software is using a trial license, the deletion module 12 does not delete the license management shared module 13 and the license management tool 14 (step S7).

Note that instead of the processing in steps S6 and S7, the deletion module 12 may display a UI (User Interface) that confirms to the user whether the license management shared module 13 and the license management tool 14 have been deleted. In addition, the deletion module 12 may delete the license management shared module 13 and the license management tool 14 depending on the operation input of the user according to this UI. In addition, the deletion module 12 may operate separately from the software uninstaller 11. Specifically, in step S2, the deletion module 12 determines whether there is an instruction for the software that is the object of deletion by the user, and if there is no instruction for the software that is the object of deletion, the processing in step S4 described above is executed. In addition, in FIG. 4, an example is explained in which the deletion module 12 deletes the license management shared module 13 and the license management tool 14, but the objects of deletion by the deletion module 12 are not limited to the license management shared module 13 and the license management tool 14. For example, the deletion module 12 may delete user data that is shared between software subject to use management.

Figure 5:
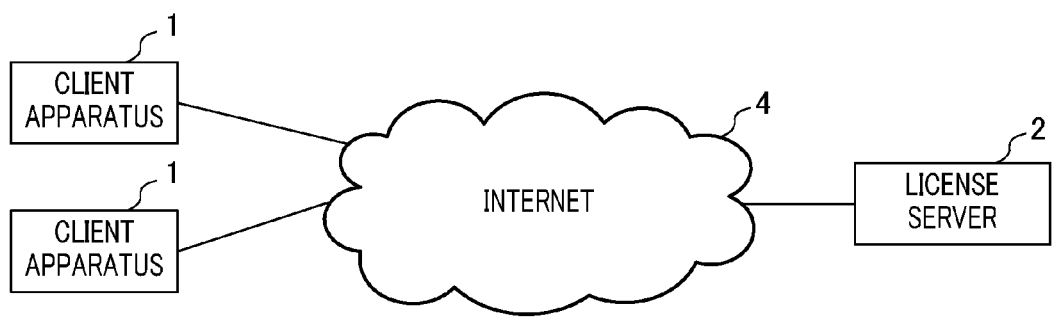
FIG. 5 is a drawing that shows an example of a system configuration of an alternative embodiment.

FIG. 5 is a drawing that shows an example of a system configuration for an alternative embodiment. In the system that is shown in FIG. 5, plural client apparatuses 1 are connected to the license server 2 via a network (the internet 4). When software is activated on the client apparatus 1, the client apparatus 1 requests the license server 2 to obtain a license via the internet 4. In the embodiment that is shown in FIG. 5 as well, the client apparatus 1 executes the deletion processing of the shared license management software 13 and the license management tool 14 according to the processing flow described above with reference to FIG. 4.

Note that the example of the application of the present invention is not limited to an example in which the license server 2 executes license processing for the software that is used on the client apparatus 1. The license server 2 may manage arbitrary special information related to the use of software other than the license, such as the personal information of the user that uses the software. In addition, the license management shared module 13 may carryout use management of software after obtaining license information used by the software from the license server 2. Additionally, when the software on the client apparatus 1 is deleted, the deletion module 12 (refer to FIG. 2A) may determine whether the software is using special information and return the special information to the license server 2 based on the determination result. Thereby, when executing the deletion of software, leaving no special software related to the use of the software managed by the license server 2 can be realized.

In addition, in the case in which the deletion module 12 determines whether software other than the software that is the object of deletion is subject to use management and has determined that this software is not subject to use management, the deletion module 12 may delete the license management shared module 13 and the license management tool 14. In addition, the deletion module 12 may delete data that is shared between software that is subject to use management. Thereby, the client apparatus 1 can delete the license management shared module 13 and data that is shared between software subject to use management while maintaining security.

Aspects of the present invention can also be realized by a computer of a system or apparatus (or units such as a CPU or MPU) that reads out and executes a program recorded on a memory unit to perform the functions of the above-described embodiments, and by a method, the steps of which are performed by a computer of a system or apparatus by, for example, reading out and executing a program recorded on a memory unit to perform the functions of the above-described embodiments. For this purpose, the program is provided to the computer for example via a network or from a recording medium of various types serving as the memory unit (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298193 filed Dec. 28, 2009, which is hereby incorporated by reference herein in its entirety.

What is claimed is:

1. An information processing apparatus that communicates via a network with a management apparatus that manages license information for the use of software, comprising:

a use management unit configured to be shared by a plurality of software and carries out use management of the software by obtaining license information for software from the management apparatus;

a first determining unit configured to determine whether or not license information for a plurality of software is being managed by the use management unit when a software among a plurality of software is to be deleted;

a return unit configured to return the license information to the management apparatus in the case in which the first determination unit has determined that license information for software to be deleted is managed by the use management unit;

a deleting unit configured to delete software for which the license information has been returned by the return unit; and a second determination unit configured to determine whether or not software other than the software to be deleted among the plurality of software is subject to use management by the use management unit, wherein the deleting unit deletes the use management unit in the case in which the second determining unit has determined that software other than the software to be deleted is not subject to use management by the use management unit.

2. An information processing apparatus according to claim 1, wherein the license information includes standard license information and trial license information, and wherein the return unit returns the standard license information to the management apparatus in the case in which the first determination unit has determined that standard license information for software to be deleted is subject to management by the use management unit.

3. An information processing apparatus according to claim 2, wherein the first determination unit determines whether or not license information for software other than the software to be deleted is subject to management by the use management unit in the case in which the second determining unit has determined that software other than the software to be deleted is subject to use management by the use management unit, and wherein the deletion unit deletes the use management unit in the case in which the first determination unit has determined that unused trial license information for software other than the software to be deleted is subject to management by the use management unit.

4. The information processing apparatus according to claim 2, wherein the first determining unit determines whether or not license information for software other than the software to be deleted is subject to management by the use management unit in the case in which the second determination unit has determined that software other than the software to be deleted is subject to use management by the use management unit, and wherein the deletion unit does not delete the use management unit in the case in which the first determination unit has determined that standard license information or trial license information for software other than the software to be deleted is managed by the use management unit.

5. A control method in an information processing apparatus that communicates via a network with a management apparatus that manages license information about the use of software, and in which a use management program shared by a plurality of software operates to carry out use management of software by obtaining license information for software from the management apparatus, the control method comprising the steps of:

determining, in a first determination step, whether or not license information for a plurality of software is managed by the use management program when a software among the plurality of software is deleted;

returning, in a return step, the license information to the management apparatus in the case in which the first determining step has determined that license information for software to be deleted is subject to management by the use management program;

deleting, in a deletion step, the software for which license information has been returned in the return step; and determining, in a second determination step, whether or not software other than the software to be deleted among the plurality of software is subject to use management by the use management program;

wherein, in the deletion step, the use management program is deleted in the case in which the second determination step has determined that software other than the software to be deleted is not subject to use management by a use management program.

6. A non-transitory computer readable storage medium on which is stored a computer program for making a computer execute a method for an information processing apparatus that communicates via a network with a management apparatus that manages license information about the use of software, and in which a use management program shared by a plurality of software operates to carry out use management of software by obtaining license information for software from the management apparatus, the method comprising the steps of:

determining, in a first determination step, whether or not license information for a plurality of software is managed by the use management program when a software among the plurality of software is to be deleted;

returning, in a return step, the license information to the management apparatus in the case in which the first determining step has determined that license information for software to be deleted is subject to management by the use management program;

deleting, in a deletion step, the software for which license information has been returned in the return step; and determining, in a second determination step, whether or not software other than the software to be deleted among the plurality of software is subject to use management by the use management program, wherein, in the deletion step, the use management program is deleted in the case in which the second determination step has determined that software other than the software to be deleted is not subject to use management by a use management program.

* * * * *